US010274070B2

(12) United States Patent
Park

(10) Patent No.: US 10,274,070 B2
(45) Date of Patent: Apr. 30, 2019

(54) HARMONIC DRIVE HAVING IMPROVED BACK DRIVABILITY, DRIVING MODULE INCLUDING THE HARMONIC DRIVE AND METHOD FOR CONTROLLING THE DRIVE MODULE

(71) Applicant: HYUNDAI MOTOR COMPANY, Seoul (KR)

(72) Inventor: Jun Hwan Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 316 days.

(21) Appl. No.: 15/175,688

(22) Filed: Jun. 7, 2016

(65) Prior Publication Data
US 2017/0167588 A1 Jun. 15, 2017

(30) Foreign Application Priority Data
Dec. 15, 2015 (KR) ........................ 10-2015-0178931

(51) Int. Cl.
*F16H 49/00* (2006.01)
*F16D 11/16* (2006.01)
*F16D 11/00* (2006.01)

(52) U.S. Cl.
CPC ........... *F16H 49/001* (2013.01); *F16D 11/16* (2013.01); *F16D 2011/006* (2013.01)

(58) Field of Classification Search
CPC .................................................. F16H 49/001
USPC ........................................................ 74/640
See application file for complete search history.

(56) References Cited

U.S. PATENT DOCUMENTS

| 6,258,007 B1 * | 7/2001 | Kristjansson | H02K 7/116 477/20 |
| 6,701,803 B1 * | 3/2004 | Tamai | F16H 49/001 74/640 |
| 7,409,891 B2 * | 8/2008 | Takemura | F16H 49/001 74/640 |
| 8,869,651 B2 | 10/2014 | Yeh | |
| 9,309,921 B2 | 4/2016 | Kanai | |
| 2006/0213320 A1 * | 9/2006 | Menjak | B62D 5/008 74/640 |

FOREIGN PATENT DOCUMENTS

| JP | 2003-222204 A | 8/2003 |
| JP | 2004-100770 A | 4/2004 |
| JP | 2005-201423 A | 7/2005 |
| JP | 2005-201425 A | 7/2005 |

(Continued)

OTHER PUBLICATIONS

Korean office Action issued in Application No. 10-2015-0178931 dated Oct. 7, 2016.

(Continued)

*Primary Examiner* — Ha Dinh Ho
(74) *Attorney, Agent, or Firm* — Morgan Lewis & Bockius LLP

(57) ABSTRACT

A harmonic drive having improved back drivability includes a wave generator, a flex spline, and a circular spline. The wave generator, the flex spline, and the circular spline transfer rotational energy; and a clutch is configured to permit and fix a rotation of at least one of the wave generator, the flex spline, and the circular spline in accordance with a transfer direction of the rotational energy.

15 Claims, 3 Drawing Sheets

(56) References Cited

FOREIGN PATENT DOCUMENTS

| | | |
|---|---|---|
| JP | 2007-040517 A | 2/2007 |
| JP | 2008-032075 A | 2/2008 |
| JP | 2014-083939 A | 5/2014 |
| KR | 10-2010-0018440 A | 2/2010 |
| KR | 10-2014-0044857 A | 4/2014 |
| KR | 10-2015-0064625 A | 6/2015 |

OTHER PUBLICATIONS

Korean Notice of Allowance issued in Application No. 10-2015-0178931 dated Apr. 24, 2017.

\* cited by examiner

HARMONIC DRIVE HAVING IMPROVED BACK DRIVABILITY, DRIVING MODULE INCLUDING THE HARMONIC DRIVE AND METHOD FOR CONTROLLING THE DRIVE MODULE

CROSS REFERENCE TO RELATED APPLICATION

The present application claims the benefit of priority to Korean Patent Application No. 10-2015-0178931, filed on Dec. 15, 2015 with the Korean Intellectual Property Office, the entirety of which is incorporated herein for all purposes by this reference.

TECHNICAL FIELD

The present disclosure relates to a harmonic drive, and more particularly, to a harmonic drive capable of remarkably improving back drivability with a simple control, a driving module including the harmonic drive, and a method for controlling the driving module.

BACKGROUND

Generally, a harmonic drive includes a cylindrical circular spline, a cup-shaped flex spline, and a wave generator. The wave generator generally has an oval shape and is installed at an inner side of the flex spline. The flex spline with which the wave generator is equipped is installed at an inner circumferential surface of the circular spline. The inner circumferential surface of the circular spline and an outer circumferential surface of the flex spline are typically machined in a tooth form to prevent a slip from occurring.

The harmonic drive may be small and light, obtain a high reduction gear ratio, and have large transfer torque capacity and a small backlash, and as a result has been widely used in various apparatuses for a precision reduction gear ratio, for example, a driving module for a CNC machine, a robot joint, or the like.

However, existing harmonic drives have a high reduction gear ratio and therefore may not avoid the reduction in back drivability. To improve the back drivability of the harmonic drive, there is a need to lower the reduction gear ratio and reduce a friction force between a motor and the drive and a rotational inertia of an input stage. However, when the reduction gear ratio is lowered, there is a need to increase the power of the motor to obtain the wanted output torque. Further, there is a limit of reducing the friction force and the rotational inertia and therefore effectiveness may be reduced.

As described above, the related art has a difficulty in improving the back drivability of the driving module including the harmonic drive.

The contents described as the related art have been provided only for assisting in the understanding for the background of the present invention and should not be considered as corresponding to the related art known to those skilled in the art.

SUMMARY OF THE DISCLOSURE

An aspect of the present disclosure provides a harmonic drive capable of remarkably improving back drivability with a simple control, a driving module including the harmonic drive, and a method for controlling the driving module.

According to an exemplary embodiment in the present disclosure, a harmonic drive having improved back drivability includes: a wave generator, a flex spline, and a circular spline, wherein the wave generator, the flex spline, and the circular spline transfer rotational energy; and a clutch configured to permit and fix a rotation of at least one of the wave generator, the flex spline, and the circular spline in accordance with a transfer direction of the rotational energy.

The clutch may permit and fix the rotation of the circular spline.

The clutch may include: a plurality of claws configured to be fixed on one surface of the circular spline and disposed along an outer circumference of the circular spline; and a plunger configured to be moved in one direction to be disposed between the plurality of claws to fix the circular spline and moved in the other direction to be spaced apart from the claws, in accordance with the transfer direction of the rotational energy, to thereby rotate the circular spline.

The wave generator may be connected to a rotation shaft of a motor of the driving module, when the rotational energy of the motor is output through the flex spline, the clutch may fix the circular spline, and when the rotational energy is input through the flex spline, the clutch may permit the rotation of the circular spline.

According to another exemplary embodiment in the present disclosure, a driving module includes: a harmonic drive including a wave generator, a flex spline, and a circular spline, wherein the wave generator, the flex spline, and the circular spline transfer rotational energy and a clutch configured to permit and fix a rotation of at least one of the wave generator, the flex spline, and the circular spline in accordance with a transfer direction of the rotational energy; a motor having a rotational shaft connected to the wave generator; and a housing enclosing the harmonic drive and the motor.

The clutch may be configured to permit and fix the rotation of the circular spline.

The clutch may include: a plurality of claws configured to be fixed to one surface of the circular spline and disposed along an outer circumference of the circular spline; and a plunger configured to be moved in one direction to be disposed between the plurality of claws to fix the circular spline and moved in the other direction to be spaced apart from the claws, in accordance with the transfer direction of the rotational energy, to thereby rotate the circular spline.

When the rotational energy of the motor is output through the flex spline, the clutch may fix the circular spline, and when the rotational energy is input through the flex spline, the clutch may permit the rotation of the circular spline.

The driving module may further include: a bearing disposed between the housing and the circular spline.

According to another exemplary embodiment in the present disclosure, a method for controlling a driving module includes steps of: detecting a transfer direction of a torque in the driving module; driving the clutch to fix the circular spline when the detected transfer direction of the torque is a reduction driving direction; and driving the clutch to permit the rotation of the circular spline when the detected transfer direction of the torque is a reduction reverse driving direction receiving the torque from the outside.

DESCRIPTION OF THE EXEMPLARY EMBODIMENTS

Hereinafter, a harmonic drive, a driving module including the harmonic drive, and a method for controlling the driving module according to various exemplary embodiments in the present disclosure will be described in detail with reference to the accompanying drawings.

Figure 1:
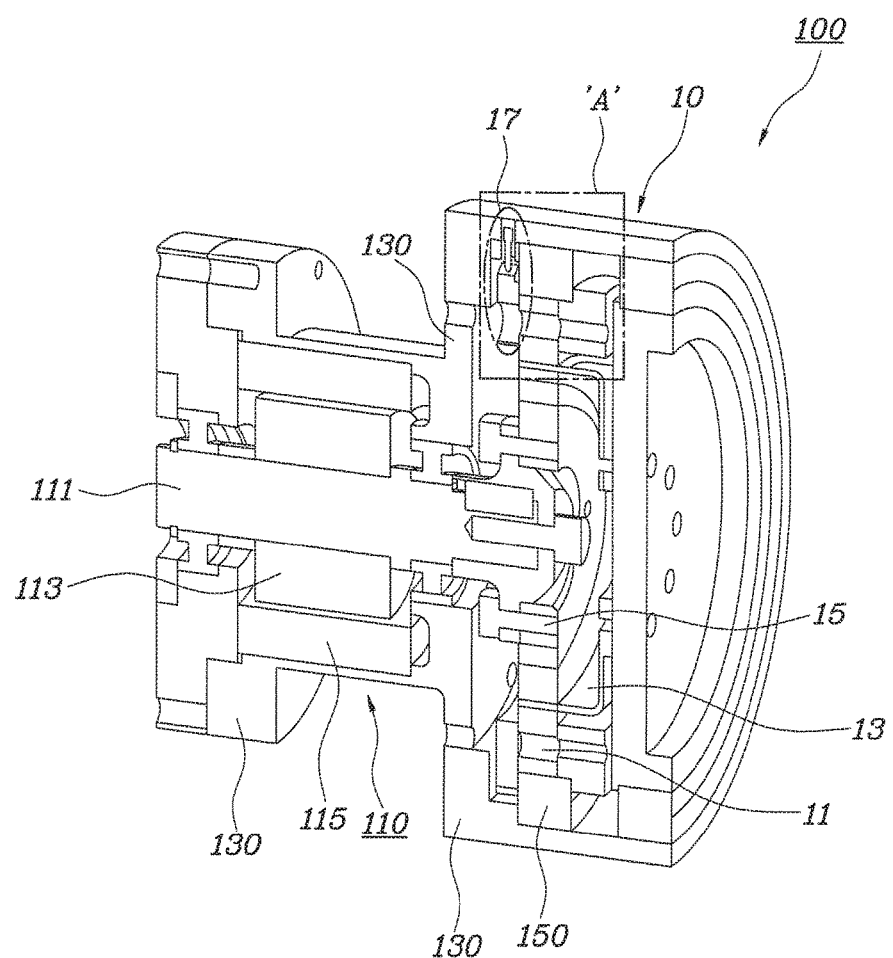
FIG. 1 is a cross-sectional perspective view illustrating a harmonic drive having improved back drivability and a driving module including the harmonic drive according to an exemplary embodiment in the present disclosure.

FIG. 1 is a cross-sectional perspective view illustrating a harmonic drive having improved back drivability and a driving module including the harmonic drive according to an exemplary embodiment.

Referring to FIG. 1, a harmonic drive 10 having improved back drivability according to an exemplary embodiment includes: a wave generator 15, flex spline 13, and a circular spline 11. The wave generator 15, the flex spline 13, and the circular spline 11 may transfer rotational energy. A clutch 17 configured to permit and fix a rotation of at least one of the wave generator 15, the flex spline 13, and the circular spline 11 in accordance with a transfer direction of the rotational energy.

Furthermore, a driving module 100 according to an exemplary embodiment may include the harmonic drive 10 described above, a motor 110 having a rotation shaft connected to the wave generator 15 of the harmonic drive 10, and a housing 130 formed to enclose the harmonic drive 10 and the motor 110.

By this configuration, the harmonic drive 10 and the driving module 100 including the same according to the exemplary embodiment act as a drive in both transfer directions of rotational energy in which rotational energy input from a driving motor is output to the outside or rotational energy transferred from the outside is output to the driving motor, thereby remarkably improving back drivability.

The harmonic drive 10 may include the circular spline 11, the flex spline 13, and the wave generator 15.

The wave generator 15 may include a cam shaft inserted into an input shaft rotated by the driving motor 110 and a wave bearing rotated while being inserted into the cam shaft to generate a wave. Further, the flex spline 13 is a cup-shaped elastic body inserted into an outer side of the wave bearing of the wave generator 15 and an inner side of a tooth form part of one side thereof may be provided with the wave bearing and a fixed part of the other side thereof may be fixed with a cross roller bearing. The circular spline 11 may have a tooth form part elastically partially meshed with the tooth form part of the flex spline 13 and may be installed at an outer side of the flex spline 13.

The harmonic drive 10 according to the exemplary embodiment may include a clutch 17 configured to permit and fix the rotation of at least one of the wave generator 15, the flex spline 13, and the circular spline 11 in accordance with the transfer direction of the rotational energy.

The driving motor 110 includes a rotor 113 to which the rotating shaft 111 is fixed and a stator 115 adjacently disposed at an outer circumference of the rotor 113 to convert electric energy into rotating kinetic energy.

The harmonic drive 10 and the driving motor 110 may be properly fixed in the housing 130 enclosing the outer side thereof.

Figure 2:
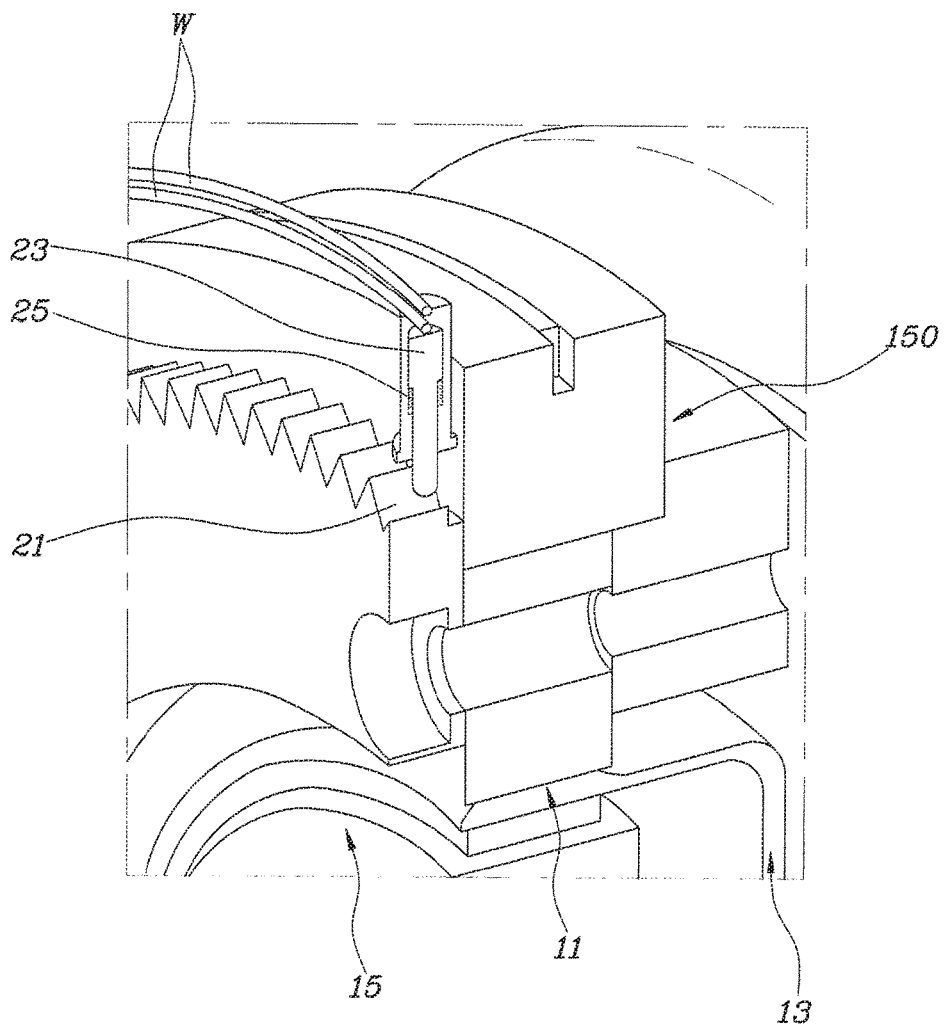
FIG. 2 is an enlarged view of a main portion of the cross-sectional perspective view illustrated in FIG. 1.

FIG. 2 is an enlarged view of a main portion of the cut perspective view illustrated in FIG. 1. In particular, FIG. 2 is an enlarged view of a portion marked by A of FIG. 1 and an enlarged view of a portion of the clutch 17.

Referring to FIGS. 1 and 2, the clutch 17 includes: a plurality of claws 21 configured to be fixed to one surface of the circular spline 11 and disposed along an outer circumference of the circular spline 11; and a plunger 23 configured to be moved in one direction to be disposed between the plurality of claws 21 to fix the circular spline 11 and moved in the other direction to be spaced apart from the claws 21, in accordance with the transfer direction of the rotational energy, to thereby rotate the circular spline 11.

The plunger 23 may be disposed between the claws 21 by an elasticity of a spring 25 or spaced apart from the claws 21. FIG. 2 illustrates an example in which the spring 25 is disposed between the plunger 23 and the claw 21 and thus the plunger 23 is spaced apart from the claw 21 in the state in which an external force is not applied.

Further, in the example illustrated in FIG. 2, upper and lower positions of the plunger 23 may be determined by a wire W disposed at an upper portion thereof. For example, when a current is conducted in the wire W, the wire W expands due to heat generated by a flow of current and thus the wire W rises. Therefore, the plunger 23 rises by the elasticity of the spring 25 and is spaced apart from the claw 21 to rotate the circular spline 11 that is in a bonded state to the claw 21.

On the contrary, when the flow of current in the wire W is interrupted, the wire W is relatively contracted to sag to press the plunger 23 downward. Therefore, the plunger 23 goes between the claw 21 and the circular spline 11 that is in the bonded state to the claw 21 is fixed.

The driving module including the harmonic drive having improved back drivability according to the exemplary embodiment of the present invention is an element of rotating the circular spline 11 upon the reverse driving and therefore a bearing 150 may be disposed between the housing 130 and the circular spline 11.

Figure 3:
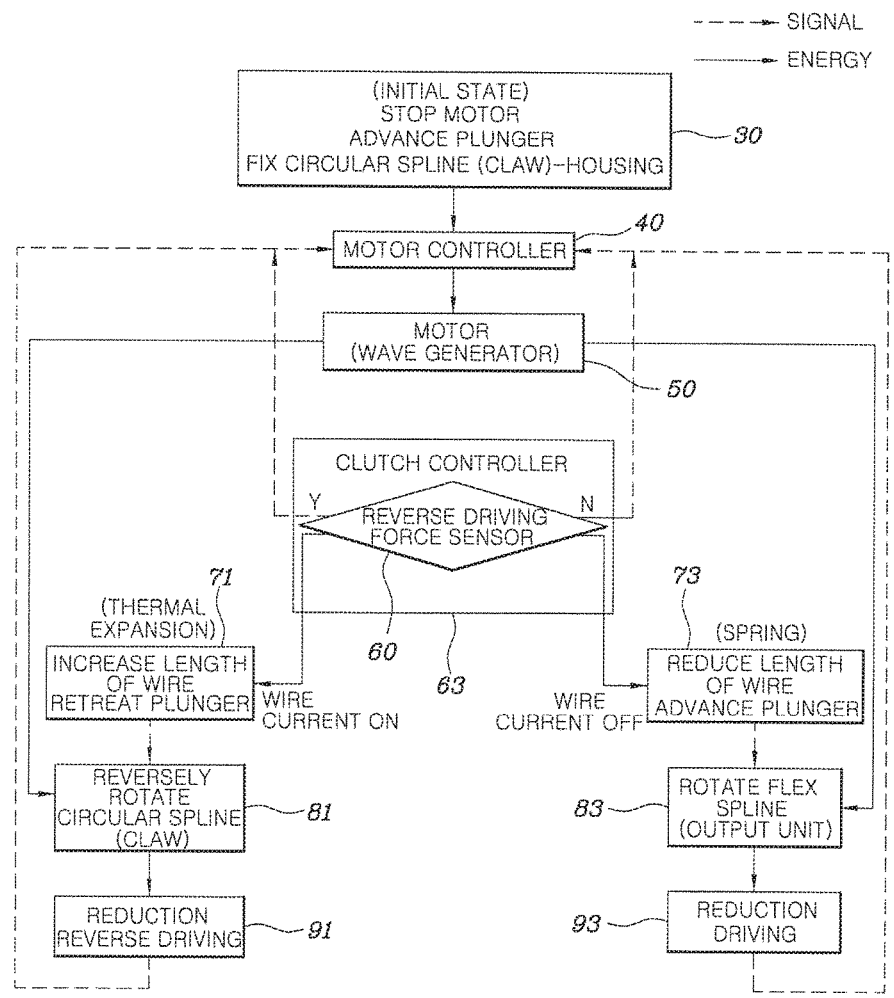
FIG. 3 is a diagram illustrating a method for controlling a harmonic drive having improved back drivability and a driving module including the harmonic drive according to an exemplary embodiment in the present disclosure.

FIG. 3 is a diagram illustrating a method for controlling a harmonic drive having improved back drivability and a driving module including the harmonic drive according to an exemplary embodiment.

In the initial state, the motor 110 is in a stopped state and the plunger 23 is advanced to be disposed between the claws 21, such that the circular spline 11 may be in the fixed state (30). This is the reduction driving state in which the the torque generated by the rotation of the motor is transferred to the wave generator 15 of the harmonic drive 10 and the torque output to the flex spline 13 is reduced.

A reverse driving force sensor 63 installed in the driving module 100 detects the transfer direction of the torque, and the result is transferred to the motor controller 40. The motor controller 40 drives the motor 50 in the detected transfer direction of the torque, and the clutch controller 60 may also determine whether to supply a current to the wire W to determine the position of the plunger 23 in the detected direction of the torque.

For example, when the transfer direction of the torque detected by the reverse driving force sensor 63 is the general reduction driving direction in which the torque of the motor is input through the wave generator and output through the flex spline, the clutch controller 60 interrupts the supply of current to the wire W to contract the wire W, such that the plunger 23 is advanced to be disposed between the claws 21, thereby fixing the circular spline 11 (73). Further, the motor controller 40 rotates the motor 50 to transfer the torque to the flex spline 13 through the wave generator 15 (83), thereby performing the reduction driving (93).

On the contrary, when the transfer direction of the torque detected by the reverse driving force sensor 63 is the reduction reverse driving direction in which the torque is input from the outside, the clutch controller 50 supplies a current to the wire W to expand and raise the wire W, such that the plunger 23 is withdrawn to be spaced apart from the claw 21 to rotate the circular spline 11 (71). Further, the motor controller 40 stops the rotation of the motor 50 and transfers the rotation of the circular spline 11 to the motor (81) to perform the reduction reverse driving (91).

Traditionally, since the circular spline is always fixed upon the reverse driving in the state in which the circular spline 11 is fixed and thus is in an accelerating state, the reverse driving torque of (friction torque)*(reduction gear ratio R) is required.

On the contrary, the harmonic drive and the driving module including the harmonic drive according to the exemplary embodiment are provided with the clutch configured to permit/interrupt the rotation of the circular spline to interrupt the rotation of the circular spline 11 when the driving module outputs the torque of the motor. Further, the clutch 17 is controlled so that the circular spline 11 is in a rotatable state upon the reverse driving to operate the circular spline 11 in a decelerating state, not the accelerating state, even when the torque is input to the motor side. In this case, comparing the foregoing related art, the reverse driving torque of (friction torque)*(reduction gear ration R/(R+1)) is required.

As described above, the harmonic drive and the driving module including the harmonic drive according to the exemplary embodiment both are operated in the decelerating state upon the driving or the reverse driving, thereby greatly improving the back drivability relative to the related art.

Further, the harmonic drive and the driving module including the harmonic drive according to the exemplary embodiment may remarkably improve the back drivability of the driving module without increasing the capacity of the motor of the driving module.

Further, the harmonic drive and the driving module including the harmonic drive according to the exemplary embodiment in the present disclosure may improve the design freedom of the driving module using the improved back drivability.

Further, the harmonic drive and the driving module including the harmonic drive according to the exemplary embodiment may improve vehicle safety and meet vehicle safety requirements when they are equipped in the equipment coordinating with a human being.

As described above, according to the harmonic drive, the driving module including the harmonic drive, and the method for controlling the driving module, it is possible to maximize the back drivability of the driving module with which the harmonic drive is equipped.

Further, according to the harmonic drive, the driving module including the harmonic drive, and the method for controlling the driving module, it is possible to remarkably improve the back drivability of the driving module without increasing the motor capacity of the driving module.

Further, according to the harmonic drive, the driving module including the harmonic drive, and the method for controlling the driving module, it is possible to improve the design freedom of the driving module using the improved back drivability.

Further, according to the harmonic drive, the driving module including the harmonic drive, and the method for controlling the driving module, it is possible to improve vehicle safety and meet vehicle safety requirements when they are equipped in the equipment coordinating with a human being.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A harmonic drive having improved back drivability, comprising:
　　a wave generator, a flex spline, and a circular spline, wherein the wave generator, the flex spline, and the circular spline transfer rotational energy; and
　　a clutch configured to permit and fix a rotation of at least one of the wave generator, the flex spline, or the circular spline in accordance with a transfer direction of the rotational energy,
　　wherein the clutch includes:
　　　　a plurality of claws fixed to a surface of the circular spline and disposed along an outer circumference of the circular spline; and
　　　　a plunger configured to be moved in one direction to be disposed between the plurality of claws and configured to be moved in another direction to be spaced apart from the claws, in accordance with the transfer direction of the rotational energy.

2. The harmonic drive having improved back drivability of claim 1, wherein the clutch is configured to permit and fix the rotation of the circular spline in accordance with the transfer direction of the rotational energy.

3. The harmonic drive having improved back drivability of claim 1, wherein the wave generator is connected to a rotation shaft of a motor of a driving module,
　　the clutch fixes the circular spline when the rotational energy of the motor is output through the flex spline, and
　　the clutch permits the rotation of the circular spline when the rotational energy is input through the flex spline.

4. The harmonic drive having improved back drivability of claim 1, further comprising a wire connected to the plunger.

5. A driving module, comprising:
　　a harmonic drive including a wave generator, a flex spline, and a circular spline, wherein the wave generator, the flex spline, and the circular spline transfers rotational energy, the harmonic drive further including a clutch configured to permit and fix a rotation of at least one of the wave generator, the flex spline, or the circular spline in accordance with a transfer direction of the rotational energy;
　　a motor having a rotational shaft connected to the wave generator; and
　　a housing enclosing the harmonic drive and the motor,
　　wherein the clutch includes:
　　　　a plurality of claws fixed to a surface of the circular spline and disposed along an outer circumference of the circular spline; and
　　　　a plunger configured to be moved in one direction to be disposed between the plurality of claws and configured to be moved in another direction to be spaced apart from the claws, in accordance with the transfer direction of the rotational energy.

6. The driving module of claim 5, wherein the clutch is configured to permit and fix the rotation of the circular spline.

7. The driving module of claim 5, wherein the clutch fixes the circular spline when the rotational energy of the motor is output through the flex spline, and the clutch permits the rotation of the circular spline when the rotational energy is input through the flex spline.

8. The driving module of claim 6, further comprising:
a bearing disposed between the housing and the circular spline.

9. The driving module of claim 5, further comprising a wire connected to the plunger.

10. A method for controlling a driving module including a harmonic drive including a wave generator, a flex spline, and a circular spline, wherein the wave generator, the flex spline, and the circular spline transfer rotational energy, the harmonic drive further including a clutch configured to permit and fix a rotation of at least one of the wave generator, the flex spline, or the circular spline in accordance with a transfer direction of the rotational energy, a motor having a rotational shaft connected to the wave generator, and a housing enclosing the harmonic drive and the motor, the method comprising steps of:

detecting a transfer direction of a torque in the driving module;

driving the clutch to fix the circular spline when the detected transfer direction of the torque is a reduction driving direction; and driving the clutch to permit the rotation of the circular spline when the detected transfer direction of the torque is a reduction reverse driving direction receiving the torque from the outside.

11. The method of claim 10, wherein the clutch includes:
a plurality of claws fixed to a surface of the circular spline and disposed along an outer circumference of the circular spline; and a plunger configured to be moved in one direction to be disposed between the plurality of claws and configured to be moved in another direction to be spaced apart from the claws, in accordance with the transfer direction of the rotational energy, wherein the step of driving the clutch to fix the circular spline includes advancing the plunger to be disposed between the claws.

12. The method of claim 10, wherein the clutch includes:
a plurality of claws configured to be fixed to a surface of the circular spline and disposed along an outer circumference of the circular spline; and a plunger configured to be moved in one direction to be disposed between the plurality of claws and moved in another direction to be spaced apart from the claws, in accordance with the transfer direction of the rotational energy, wherein the step of driving the clutch to permit the rotation of the circular spline includes withdrawing the plunger to be spaced apart from the claws.

13. A driving module, comprising:
a harmonic drive including a wave generator, a flex spline, and a circular spline, wherein the wave generator, the flex spline, and the circular spline transfer rotational energy, the harmonic drive further including a clutch configured to permit and fix a rotation of at least one of the wave generator, the flex spline, or the circular spline in accordance with a transfer direction of the rotational energy, a motor having a rotational shaft connected to the wave generator, a housing enclosing the harmonic drive and the motor, and a reverse driving force sensor to detect the transfer direction of a torque in the driving module wherein when the transfer direction of the torque detected by the reverse driving force sensor is a reduction driving direction, the clutch is driven to fix the circular spline, and when the transfer direction of the torque detected by the reverse driving force sensor is a reduction reverse driving direction in which the rotational energy is input from the outside, the clutch is driven to permit the rotation of the circular spline.

14. The driving module of claim 13, wherein the clutch includes a plurality of claws fixed to a surface of the circular spline and disposed along an outer circumference of the circular spline, and a plunger configured to be moved in one direction to be disposed between the plurality of claws to fix the circular spline and moved in another direction to be spaced apart from the claws, in accordance with the transfer direction of the rotational energy.

15. The driving module of claim 13, wherein the clutch includes a plurality of claws fixed to a surface of the circular spline and disposed along an outer circumference of the circular spline, and a plunger configured to be moved in one direction to be disposed between the plurality of claws and moved in another direction to be spaced apart from the claws to permit the rotation of the circular spline, in accordance with the transfer direction of the rotational energy.

* * * * *